(12) United States Patent  
Eigenbrode

(10) Patent No.: US 8,186,402 B2
(45) Date of Patent: May 29, 2012

(54) DEVICE FOR AUTOMATICALLY MAINTAINING TIRE PRESSURE

(75) Inventor: Brett Eigenbrode, Los Angeles, CA (US)

(73) Assignee: Pressure Sentinel, Inc, Piedmont, CA (US)

( * ) Notice: Subject to any disclaimer, the term of this patent is extended or adjusted under 35 U.S.C. 154(b) by 172 days.

(21) Appl. No.: 12/410,347

(22) Filed: Mar. 24, 2009

(65) Prior Publication Data

US 2010/0243121 A1   Sep. 30, 2010

(51) Int. Cl.
 *B60C 23/12* (2006.01)
(52) U.S. Cl. .......... 152/415; 152/424; 152/426
(58) Field of Classification Search .......... 152/415, 152/418, 419, 423, 424, 425, 426; 137/224, 137/224.5, 225
See application file for complete search history.

(56) References Cited

U.S. PATENT DOCUMENTS

| 1,207,427 | A | * | 12/1916 | Molkenbur | 152/426 |
| 5,109,905 | A | * | 5/1992 | Lambe | 152/342.1 |
| 5,616,196 | A | | 4/1997 | Loewe | |
| 5,865,917 | A | | 2/1999 | Loewe | |
| 5,975,174 | A | | 11/1999 | Loewe | |
| 7,117,731 | B2 | * | 10/2006 | Hrabal | 73/146 |
| 7,225,845 | B2 | * | 6/2007 | Ellmann | 152/426 |
| 7,314,072 | B2 | * | 1/2008 | Bunker | 152/419 |
| 7,322,392 | B2 | | 1/2008 | Hawes | |
| 2004/0112495 | A1 | * | 6/2004 | Weise | 152/331.1 |

FOREIGN PATENT DOCUMENTS

DE  3433318 A1 * 3/1986
DE  4323835 A1 * 1/1995

OTHER PUBLICATIONS

Machine Translation of DE 3433318 A1.*

* cited by examiner

*Primary Examiner* — Kip T Kotter

(57) ABSTRACT

A device for automatically maintaining tire pressure is adapted to pump air into a tire up to two times per wheel revolution. Embodiments of the device include a flexible compression strip adapted for attachment to an inner peripheral surface of a tire. Opposing compression faces on the compression strip apply pressure to a compression tube attached to the compression strip. Air in an air reservoir inside the compression tube is expelled from a collapsible segment of the compression tube pressed on by the compression faces and into accumulator segments extending beyond the edges of the compression strip. A ratio of the combined volumes of the collapsible and accumulator segments to the volume of the collapsible segment determines a set point pressure. Air is expelled into a tire having an inflation pressure less than the set point pressure but is not expelled into a tire having pressure greater than the set point pressure.

16 Claims, 13 Drawing Sheets

Section A-A

SECTION B-B

SECTION B-B

SECTION C-C

SECTION C-C

SECTION C-C

Section A-A

Section A-A

DEVICE FOR AUTOMATICALLY MAINTAINING TIRE PRESSURE

FIELD OF THE INVENTION

The present invention relates to a device for maintaining a selected amount of internal air pressure in a pneumatic tire.

BACKGROUND

Maintaining tire inflation pressure within limits specified by tire and vehicle manufacturers is important for safe and efficient vehicle operation. Underinflated tires may result in poor vehicle handling, reduced fuel economy, reduced tread life, and increased risk of tire failure from frictional heating and puncture. Unfortunately, many vehicles are operated with underinflated tires because vehicle operators may not check tire inflation pressure until they have a visual indication of underinflation. However, by the time a tire is visibly underinflated, tire pressure may already be low enough to cause tire damage, impair vehicle safety, increase tire wear, and decrease vehicle fuel efficiency.

Many devices have been proposed to automatically maintain tire inflation pressure. Some devices couple an air supply through the rotating hub of a vehicle's wheel and inflate or deflate the vehicle's tires in response to measurements of tire inflation pressure. Other devices place a battery-operated pump and pressure transducer inside the air chamber between a tire and a wheel and add air as needed to maintain inflation pressure at a set point value. Although such devices may give very precise control of inflation pressure and may be able to respond to changes in load or road conditions, they are generally incapable of regulating tire pressure without a source of electrical power and are relatively expensive to manufacture, install, and maintain.

Other devices employ a mechanical linkage and a mechanical pressure regulating device to replace air lost from a tire by leakage. The mechanical linkage generates a force related to a change in a separation distance between a reference position, for example a part of the wheel, and a part of an inner peripheral surface of the tire above the flattened contact patch between the tire's tread surface and a road surface. The force generated by the mechanical linkage is used to increase the pressure in a compression chamber. If the resulting pressure in the compression chamber is higher than the air pressure in the tire, an opposing spring force in the pressure regulating mechanism is overcome, a valve opens, and air flows from the compression chamber into the tire.

A separation distance between the inner peripheral surface of a tire and the rotational center of the tire varies with an amount of weight supported by the tire, tire rotation speed, tire inflation pressure, stiffness of tire materials, and other factors. It is therefore difficult to predict the forces generated by and within the mechanical linkage, and automatic inflation devices having mechanical linkages and mechanical pressure regulators have several disadvantages related to the use under commonly encountered operating conditions. Such devices are relatively heavy, making a tire and wheel difficult to rotationally balance. Furthermore, the mechanical linkage and pressure regulator are each subjected to an operating cycle once per wheel revolution, and over the course of a normal service lifetime of a tire, experience millions or even tens of millions of operating cycles. Over such a large number of operating cycles, material properties such as spring constants of components in the pressure regulating mechanism may change from work hardening, self heating, heating from hot road surfaces, heating from vehicle braking system components, corrosion from exposure to water, salt, and other chemicals, or combinations of these effects. As material properties change, the regulated pressure may also change or pressure regulation may fail entirely.

Mechanical wear and dynamic loads from impacts with obstacles or uneven road surfaces may cause some components in a mechanical linkage to bend or break. The air pumping mechanism may fail to operate, or worse yet, metal pieces may be released into the tire, potentially causing sudden, catastrophic tire failure. Or, a mechanical linkage may weaken parts of a tire by repeatedly rubbing or pressing on the tire, possibly leading to tire failure.

What is needed is a device for automatically maintaining tire pressure that is light in weight, simple and economical to install in conventional wheels and tires, reliable, operates without electrical power, does not cause wear on a tire surface, does not includes springs or linkages which may be damaged by friction or impact, and may be adapted to many different sizes of tubeless tires or tires with inner tubes.

SUMMARY

A pressure maintenance device for automatically maintaining inflation pressure in a pneumatic tire is adapted to pump air into a tire up to two times per wheel revolution. Embodiments of the pressure maintenance device include a flexible compression strip adapted for attachment to an inner peripheral surface of a tire, or alternately to an inner peripheral surface of an inner tube for a tire, and an air reservoir attached to the compression strip. In some embodiments, the compression strip includes two separate compression blocks. In other embodiments, two compression blocks are integrally formed with an interconnecting flexible web. While operating in a rolling tire installed on a vehicle, an angle between opposing compression faces in the compression strip decreases each time the compression strip passes over an edge of a contact patch on the tire. As the angle between compression faces decreases, pressure is applied to the sides of the air reservoir by the compression faces, and air inside the air reservoir is displaced from a collapsible segment of the air reservoir between the compression faces into accumulator segments extending beyond the edges of the compression blocks. Air is released from the air reservoir into the tire when air pressure in the air reservoir is greater than air pressure in the tire. An example of an acceptable material for a compression tube is a flexible polymer material. In some embodiments, the compression strip and the air reservoir are made as an integral unit.

The angle between the opposing compression faces returns to an uncompressed state after the compression strip passes an edge of the contact patch. Air is then drawn into the air reservoir from outside the tire. An inlet valve inside the air reservoir allows air to flow into the air reservoir from outside the tire and prevents air from inside the reservoir from flowing back out of the tire. An outlet valve inside the air reservoir allows air to flow from the reservoir into the tire, or alternately into an inner tube inside the tire, and prevents air from inside the tire or inner tube from flowing back into the air reservoir.

An inlet end of the air reservoir, for example the inlet end of a compression tube, is connected in some embodiments by flexible tubing to a tire valve which has a bypass hole for admitting air from outside the tire into the flexible tubing. The bypass hole in the tire valve provides an entry for air from outside the tire that is separate from the valve mechanism in the tire valve. In some embodiments of the pressure maintenance device, a bypass hole is formed in a part of the wheel and is not part of the tire valve, and the flexible tubing is connected instead to the wheel so as to receive air through the bypass hole in the wheel. In embodiments having a tire valve, the valve mechanism in the tire valve is optionally one of several conventional types and may be used to inflate or deflate the tire in the conventional manner. A tire valve included with the invention may alternately be formed from a polymer compound as ordinarily used in, for example, automobile tire valves, from metal as sometimes used in, for example, truck tire valves, or a combination of materials. A tire valve made from metal optionally includes an attachment post for connection of the flexible tubing to the air reservoir.

A pressure maintenance device in accord with an embodiment of the invention is adapted to release air into a tire when internal tire pressure is less than a specified pressure set point value, for example a pressure set point value equal to a cold inflation pressure specification for a tire. The pressure set point value is related to a ratio of the volume of the segment of the air reservoir between the compression faces of the compression strip, referred to as the collapsible segment of the air reservoir, to the combined volumes of the collapsible segment and one or more accumulator segments, where an accumulator segment is a part of the air reservoir that extends beyond the edges of the compression faces. Air is not released from the compression tube into the tire when tire inflation pressure is greater than or equal to the pressure set point value related to the ratio of volumes.

This section summarizes some features of the present invention. These and other features, aspects, and advantages of the invention will become better understood with regard to the following description and upon reference to the following drawings, wherein:

BRIEF DESCRIPTION OF THE DRAWINGS

FIG. 14 further illustrates an axis of rotation for the wheel and tire.

FIG. 16 further illustrates corner radii formed on the inner peripheral surface of the tire above the leading and trailing edges of a flattened sector representing the contact patch, and the location of an enlarged view shown in FIG. 19.

FIG. 17 further illustrates the location of an enlarged view shown in FIG. 20.

DESCRIPTION

A device for automatically maintaining tire pressure is adapted to pump air into an underinflated pneumatic tire until air pressure in the tire slightly exceeds a specified pressure set point. Examples of a pressure set point include but are not limited to a cold inflation pressure for a tire, an operating inflation pressure, an inflation pressure related to a specified load condition, an inflation pressure related to preferred vehicle handling characteristics, or an inflation pressure related to a preferred amount of traction. Some embodiments of a pressure maintenance device in accord with an embodiment of the invention are adapted for installation in tubeless pneumatic tires, for example but not limited to, tires for automobiles, trucks, trailers, agricultural equipment, construction equipment, motorcycles, industrial vehicles such as mobile cranes and fork lifts, and so on. Other embodiments are adapted for installation in an inner tube at the time the inner tube is manufactured.

Embodiments of the invention are well suited for installation in fleet vehicles, where labor costs and vehicle availability make routine checks of tire inflation pressure difficult or expensive. A pressure maintenance device may optionally be installed in a new tire or inner tube for a tire at the time the tire or inner tube is manufactured, or may be retrofit into a tire as an aftermarket item. Other advantages of the disclosed embodiments include light weight, rotational balancing of a tire by conventional means with conventional tools, and adaptability to different pressure set points and tire sizes. Still other advantages include resistance to damage from a tire rolling into an obstacle or rolling over rough or broken pavement, and lack of components which could break free and cause damage to the tire.

Figure 1:
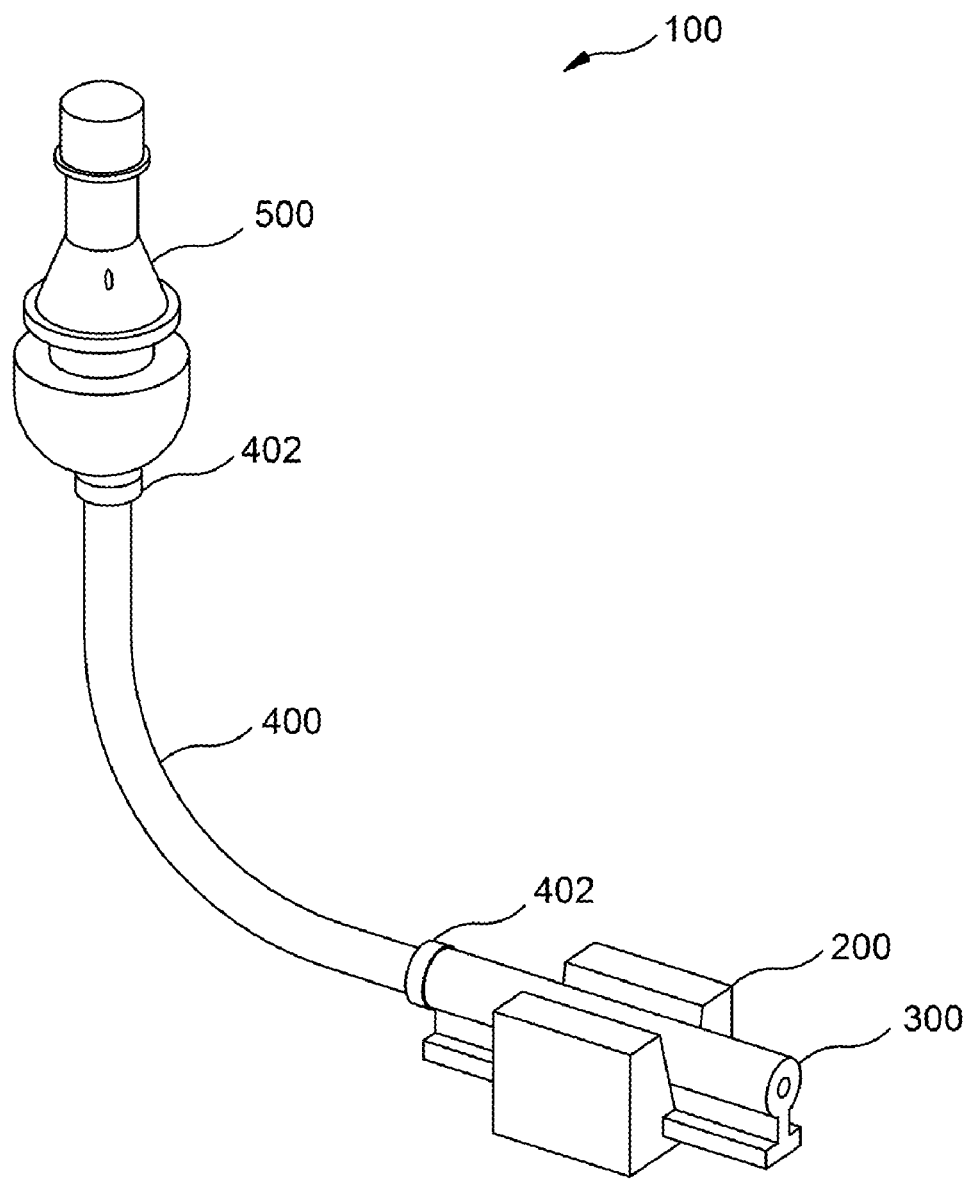
FIG. 1 is a pictorial view of an example of an embodiment a device for automatically maintaining tire pressure.

An example of a device for automatically maintaining tire pressure is shown in FIG. 1. The pressure maintenance device 100 of FIG. 1 includes a compression strip 200 adapted for attachment to an inner peripheral surface of a tire, or alternately to an inner peripheral surface of an inner tube for a tire. A compression tube 300 is attached to the compression strip 200 between opposing angled compression faces of the compression strip. In the example of FIG. 1, the compression strip 200 and compression tube 300 include interlocking structural elements to prevent the compression tube 300 from being separated from the compression strip 200 in the event the tire in which the pressure maintenance device 100 is mounted receives a strong impact.

In some embodiments, the compression strip 200 and compression tube 300 are joined to each other by adhesive. Alternatively, the compression tube and compression strip may be joined by thermal fusing or by chemical bonding as in, for example, fusing with a chemical solvent or vulcanization. In yet other embodiments, the compression strip 200 and compression tube 300 are formed as an integral part.

A length of flexible tubing 400 is attached to an inlet end of the compression tube 300 by an optional tubing connector 402. Alternatively, the tubing connector 402 is omitted and the flexible tubing 400 is attached to the compression tube 300 by adhesive, or the flexible tubing 400 is formed as an integral part of the compression tube 300. The flexible tubing 400 is further connected to another optional tubing connector 402, which is inserted into a through-hole formed in a tire valve 500. Alternatively, the flexible tubing 400 is attached directly to the tire valve 500, or the flexible tubing 400 and a tubing connector 402 are attached to a part of the wheel having a through-hole for admitting air from outside the tire.

Figure 2:
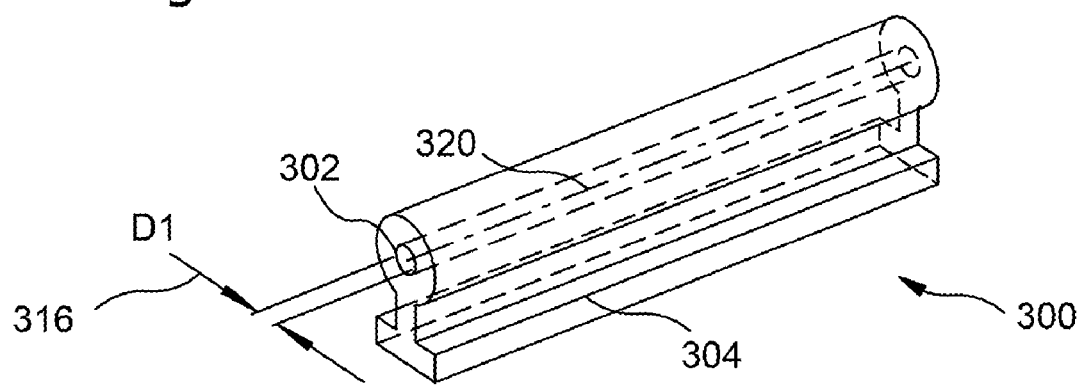
FIG. 2 is a pictorial view of an example of an air reservoir. In the example of FIG. 2, the air reservoir is a compression tube.

The compression tube 300 from FIG. 1 is an example of an air reservoir into which air is drawn and pressurized to a selected pressure set point value. A compression tube is shown in more detail in FIG. 2. The compression tube 300 of FIG. 2 is formed with a through-hole 302 having a longest axis 320 and a diameter D1 316. Some segments of the through-hole 302 function as accumulator segments of an air reservoir and other segments function as collapsible segments of an air reservoir as will be explained. The compression tube 300 further includes a foot 304 having a shape adapted to interlock with a correspondingly-shaped compression tube channel in a compression strip. A height dimension of the foot 304 is selected to place the sides of the cylindrical portion of the compression tube 300 in contact with opposing angled compression faces on a compression strip. The compression tube 300 is formed from a flexible polymer material strong enough to withstand a pressure greater than a selected pressure set point and durable enough to withstand millions of compression cycles.

Figure 3:
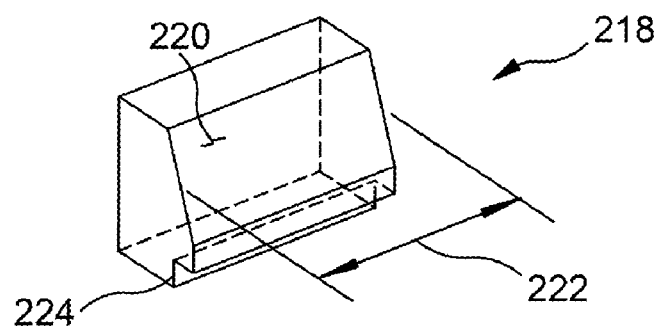
FIG. 3 is a pictorial view of an example of a compression block.
Figure 4:
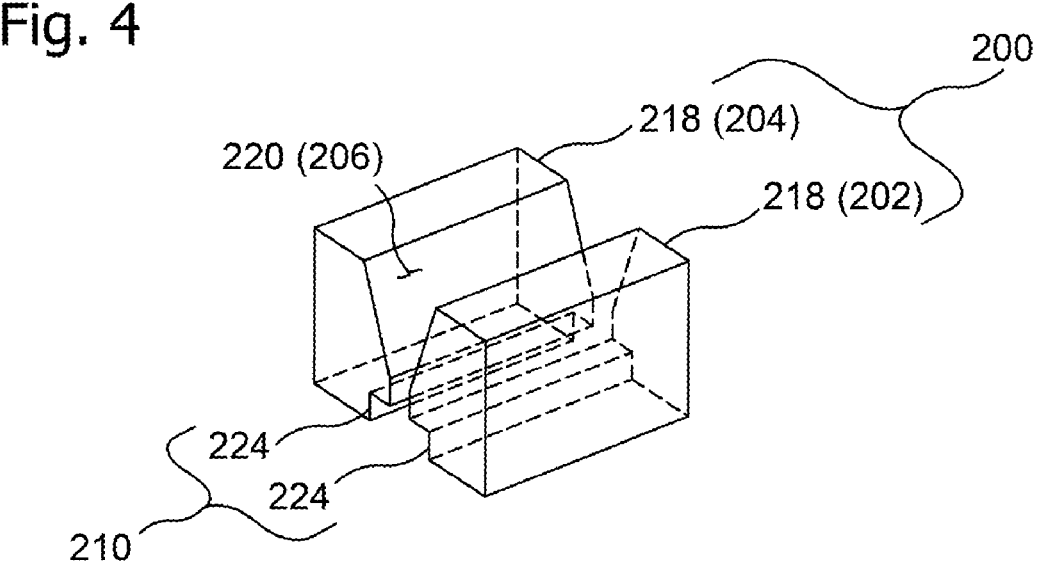
FIG. 4 is a pictorial view of an example of a compression strip having two compression blocks.

A compression strip includes two compression blocks for applying pressure to an air reservoir such as the compression tube of FIG. 2. An example of a compression block 218 is shown in FIG. 3. The compression block 218 is preferably formed from a polymer material having a value of durometer that is greater than a value of durometer of a material used to form an air reservoir. The compression block is formed with an angled compression face 220 for pressing against an air reservoir and a retaining channel 224 for holding a component having an air reservoir. In the example of FIG. 4, two compression blocks 218 are placed a selected distance apart to form between them a compression tube channel 210 for retaining a compression tube. When installed in a tire, one compression block 218 becomes a leading compression block 202 and the other compression block 218 becomes a trailing compression block 204. A first compression face 206 corresponds to the compression face 220 on the trailing compression block 204. A second compression face on the leading compression block 202 is not directly visible in FIG. 4. Two compression blocks 218 positioned to receive a component with an air reservoir, as in FIG. 4, are referred to herein as a compression strip.

Figure 5:
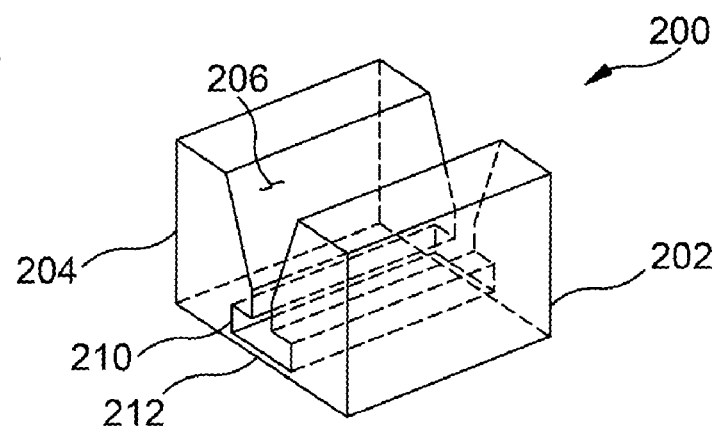
FIG. 5 is a pictorial view of an example of a compression strip having two compression blocks joined by a flexible web.

FIG. 5 illustrates another embodiment of a compression strip. The compression strip 200 of FIG. 5 includes a leading compression block 202 joined to a trailing compression block 204 by a relatively thin web 212. The trailing compression block 204 is formed with an angled compression face 206. An opposing angled compression face 208 on the leading compression block 202 is not directly visible from the viewing angle of FIG. 5 but is presented in later figures. The function of the web 212 is to maintain a preferred spacing between the leading compression block 202 and the trailing compression block 204 during installation of the compression strip 200 in a tire or tube, to provide a large surface for bonding the compression strip 200 to an inner peripheral surface of a tire or inner tube, and to define the bottom of a compression tube channel 210 into which a compression tube 300 is inserted. The web 212 is thin to permit the compression faces on the leading and trailing compression blocks to be easily displaced toward one another in order to apply pressure to the collapsible segment of a compression tube in contact with the opposing compression faces in a compression strip.

Figure 6:
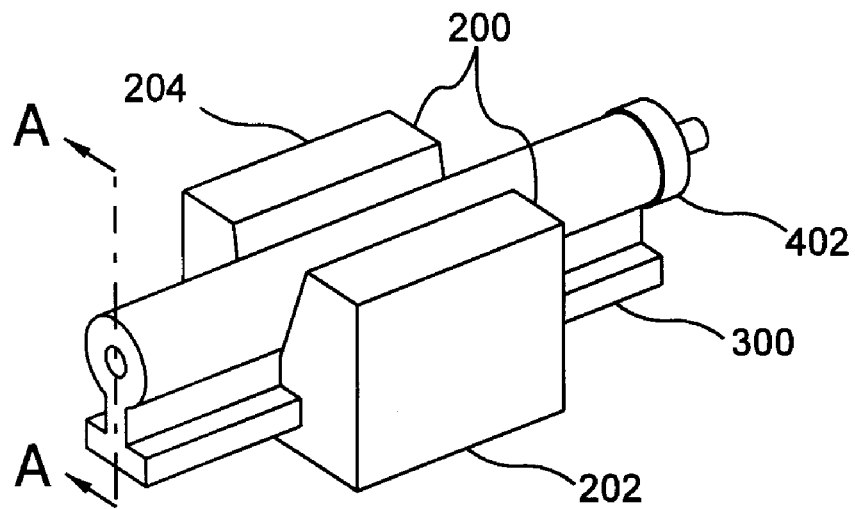
FIG. 6 is a pictorial view of an example of a compression tube assembled to a compression strip.

The compression strip 200 and compression tube 300 are attached to each other as shown in the example of FIG. 6. In a preferred embodiment, the compression strip 200 and the compression tube 300 are attached to one another with adhesive. As shown in FIG. 6, a tubing connector 402 is attached to the inlet end of the compression tube 300. A segment of the compression tube 300 fits within the compression strip 200, between the leading compression block 202 and the trailing compression block 204. The segment of the compression tube 300 between the compression faces of the compression strip 200 is referred to as the collapsible segment of the compression strip, or alternately as the collapsible segment of the air reservoir. The segments of the compression tube extending beyond the edges of the vertical sides of the compression strip are referred to as accumulator segments. A sequence of motions of the compression strip and compression tube during a compression cycle will be described later.

Figure 7:
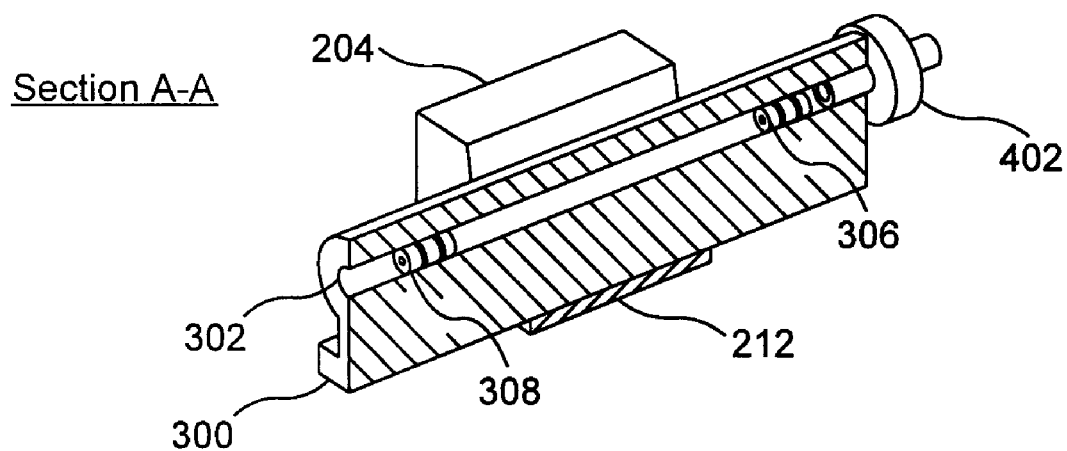
FIG. 7 is a sectional view of the embodiment of FIG. 6 showing internal parts of an air reservoir. The location and viewing direction for FIG. 7 is shown by a line marked A-A in FIG. 6.

A sectional view A-A in FIG. 7 shows an example of parts of an air reservoir. A location and viewing direction for the sectional view of FIG. 7 is shown by a line marked A-A in FIG. 6. The web 212 can be seen in FIG. 7 to be relatively thin compared to the trailing compression block 204. Some embodiments of a pressure maintenance device, for example embodiments having compression blocks as in FIG. 3 and FIG. 4, do not have a web. An optional tubing connector 402 is installed in the inlet end of the compression tube 300. In the example of FIG. 7, the compression tube 300 is formed with a cylindrical through-hole 302 passing from the inlet end to an outlet end. An inlet valve 306 installed near the inlet end of the through-hole 302 and an outlet valve 308 near an outlet end of the through-hole 302 define the ends of an air reservoir having a collapsible segment and two accumulator segments.

Figure 8:
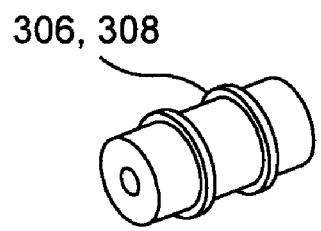
FIG. 8 is a simplified pictorial view of a valve for controlling a direction of air flow in an air reservoir.

An example of an inlet valve 306 and an outlet valve 308 is shown in the pictorial representation of FIG. 8. A simple valve mechanism, for example a ball and spring or a flapper valve, are enclosed within a valve housing having sealing rings for creating an airtight fit within the through hole 302. The valve mechanism permits air to flow from an inlet side of the valve to an outlet side of the valve, but prevents air from flowing in the reverse direction. In embodiments of a pressure maintenance device, the valves are arranged so as to permit air from outside a tire to flow into the air reservoir, but air from within the tire is prevented from flowing back out of the tire.

In some embodiments, outside air enters the compression tube 300 though a bypass hole 508 formed in a tire valve 500 connected to the compression tube 300 by the flexible tubing 400. The example of a tire valve 500 of FIG. 9 includes a valve cap 502 for covering an end of valve mechanism inside a tire stem 504. A valve mechanism in any of the tire valve examples discussed herein may be of any conventional type, for example a Schrader valve mechanism, and will not be further described. The valve stem 504 is attached to a valve body 506 which has a diameter and a mounting lip adapted for a press fit in an aperture in a wheel.

Figure 9:
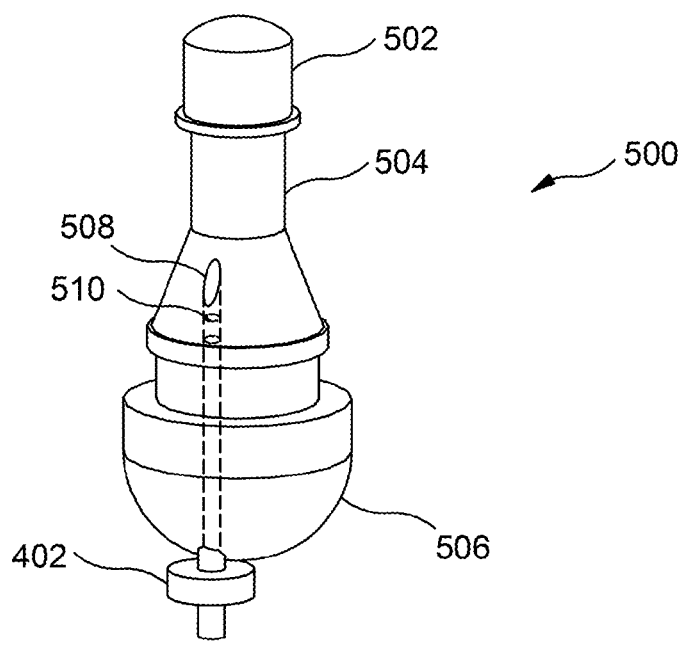
FIG. 9 is a simplified pictorial view of an example of a tire valve optionally included with an embodiment of the invention. The tire valve in FIG. 9 is an example of a modified version of a snap-in Schrader tire valve.

The tire valve 500 of FIG. 9 differs from a conventional Schrader tire valve in the addition of the bypass hole 508 passing through the valve body 506 and optionally through part of the valve stem 504, thereby providing a pathway for outside air to bypass the valve mechanism within the tire valve. An optional tubing connector 402 inserted into an end of the bypass hole 508 provides an attachment point for flexible tubing connected to a compression tube. The tire valve 500 further differs from a conventional Schrader valve in the addition of a filter element 510 inserted into the bypass hole 508. The filter element 510, which may be made from a hydrophobic material such as polytetrafluoroethylene (PTFE), prevents foreign matter such as water and small solid particles from entering the flexible tubing and interfering with operation of the compression tube or passing into the interior of the tire. The example of a filter element 510 in FIG. 9 has a cylindrical shape but may optionally be provided as a relatively thin disk.

Figure 10:
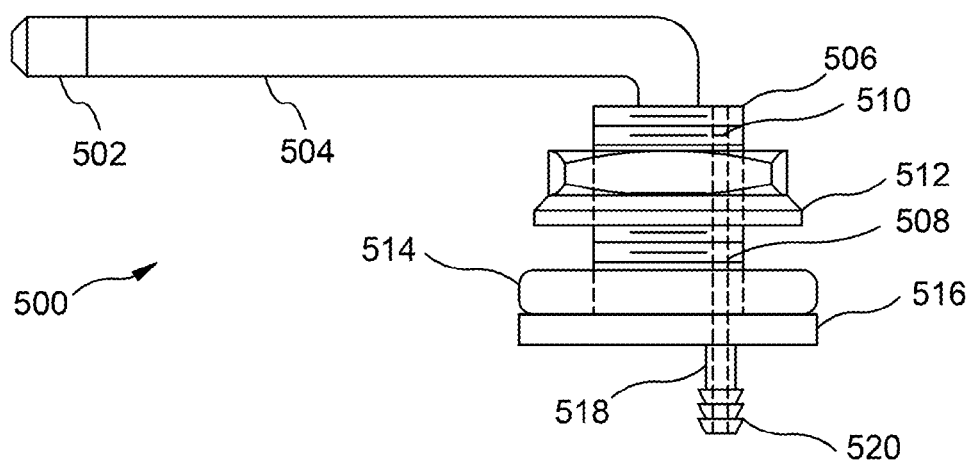
FIG. 10 is a simplified side view of an example of a metal tire valve optionally included with an embodiment of the invention. The tire valve example of FIG. 10 is a modified version of a metal Schrader valve adapted for retention in a wheel by a flanged retaining nut removably assembled onto a correspondingly threaded valve body.
Figure 11:
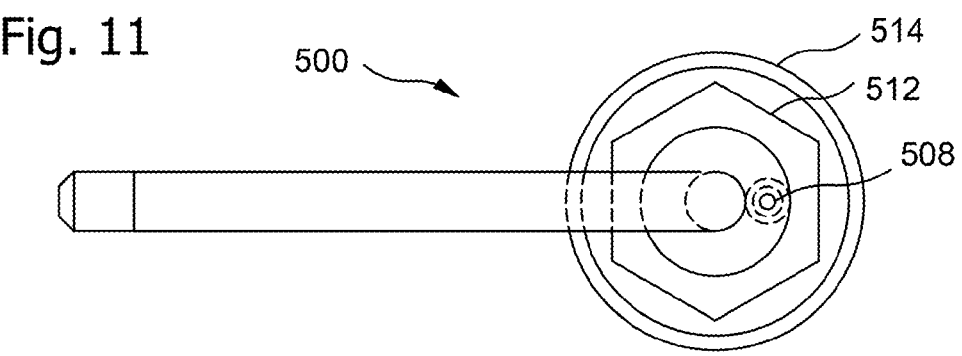
FIG. 11 is a top view of the example of a metal tire valve from FIG. 10.

In some embodiments, the tire valve 500 is replaced with a metal tire valve as shown in FIG. 10 and FIG. 11. FIG. 10 is a side view of a metal tire valve having a valve cap 502 removably attached to a valve stem 504. FIG. 11 is a top view of the tire valve 500 shown in FIG. 10. The valve stem 504 is attached at a right angle to the valve body 506, which is fitted with a flange 516 for positioning the tire valve 500 in an aperture formed in a wheel. A flanged nut 512 compresses a gasket 514 between a surface of the wheel and the flange 516 to hold the tire valve 500 in place and form an airtight seal against the wheel. The metal tire valve 500 of FIG. 10 and FIG. 11 differs from a conventional metal tire valve in having a bypass hole 508 and a filter element 510 as described for the tire valve example of FIG. 9. The metal tire valve 500 further differs from a conventional metal tire valve in the addition of an attachment post 518 for attaching flexible tubing for connecting a compression tube. The attachment post 518 is formed with retaining features 520, for example hose barbs, to prevent flexible tubing from slipping off the attachment post 518. One will appreciate that many alternative embodiments of the metal tire valve 500 of FIG. 10 and FIG. 11 may optionally be made with different lengths of a valve stem 504 and different angles between the valve stem 504 and valve body 506.

Figure 12:
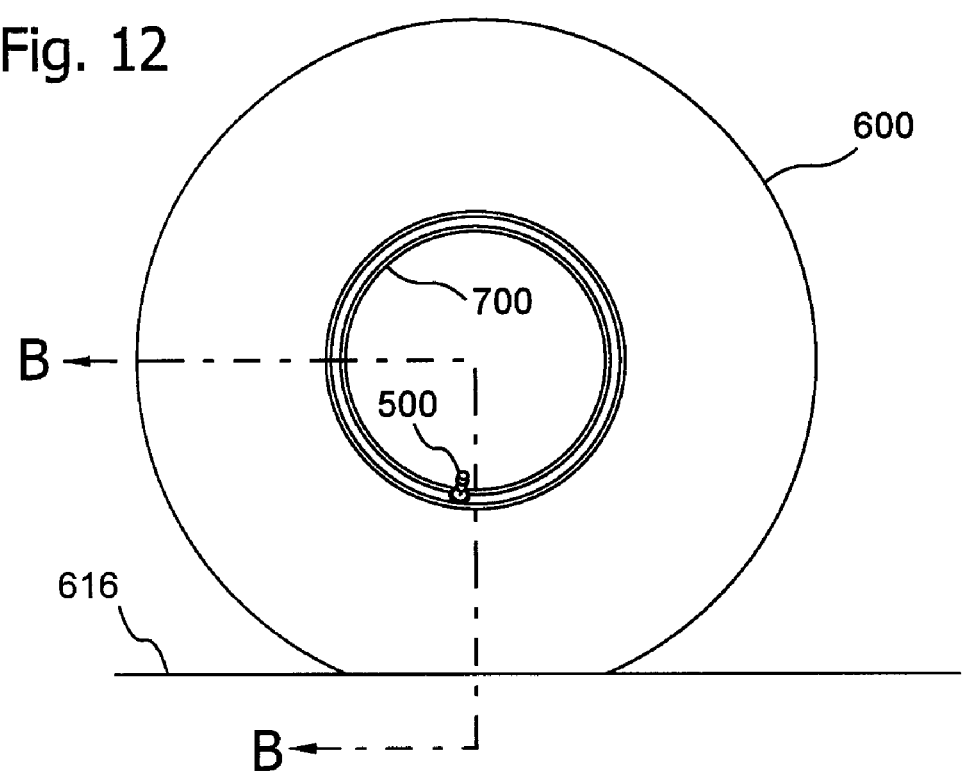
FIG. 12 is a side view representing an example of a portion of a wheel and a pneumatic tire on a road surface. The example of a wheel in FIG. 12 shows the rim of the wheel but omits features in the central portion of the wheel.
Figure 13:
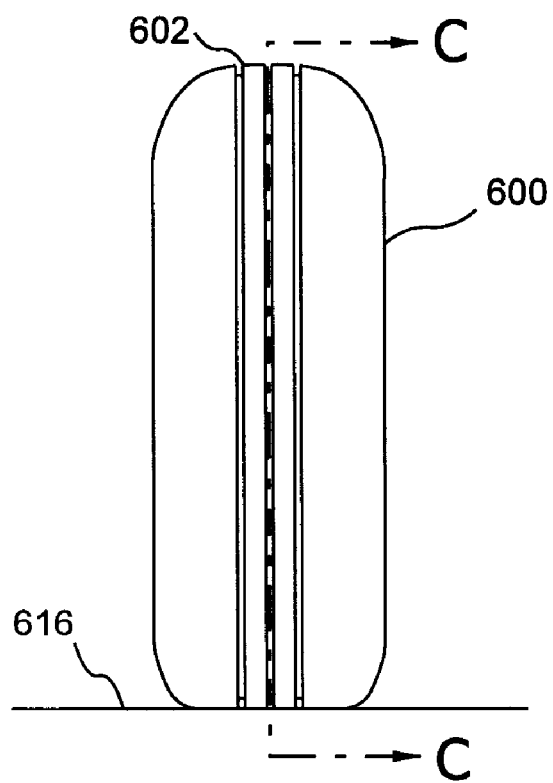
FIG. 13 is a view toward the outer peripheral surface, that is, the tread surface, of the example of a tire from FIG. 12.
Figure 14:
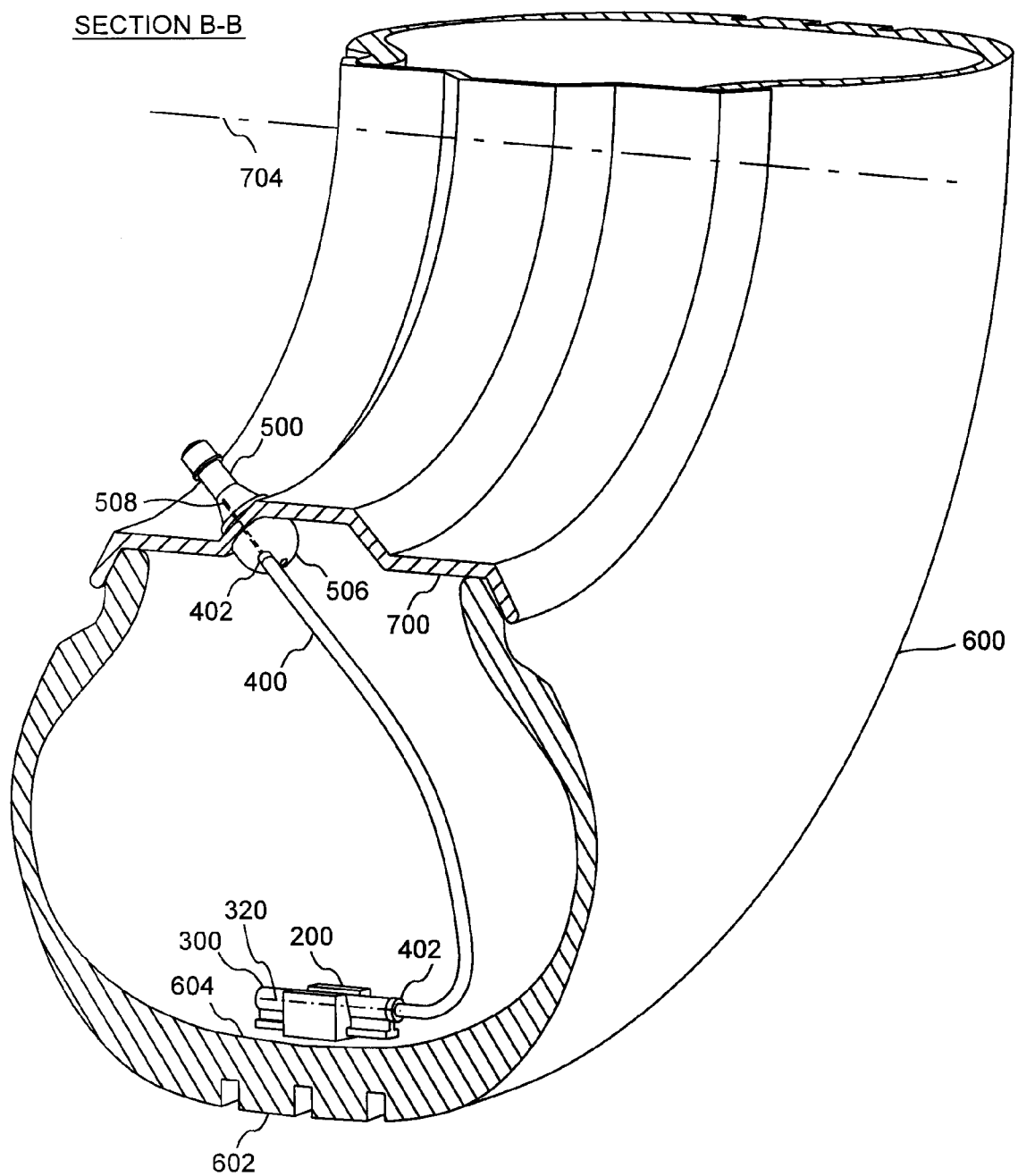
FIG. 14 is a pictorial view of a section of an example of a tubeless pneumatic tire and a wheel rim, showing an example of a mounting location for the pressure maintenance device example of FIG. 1. A location and viewing direction for FIG. 14 is shown by a line marked B-B in FIG. 12.
Figure 15:
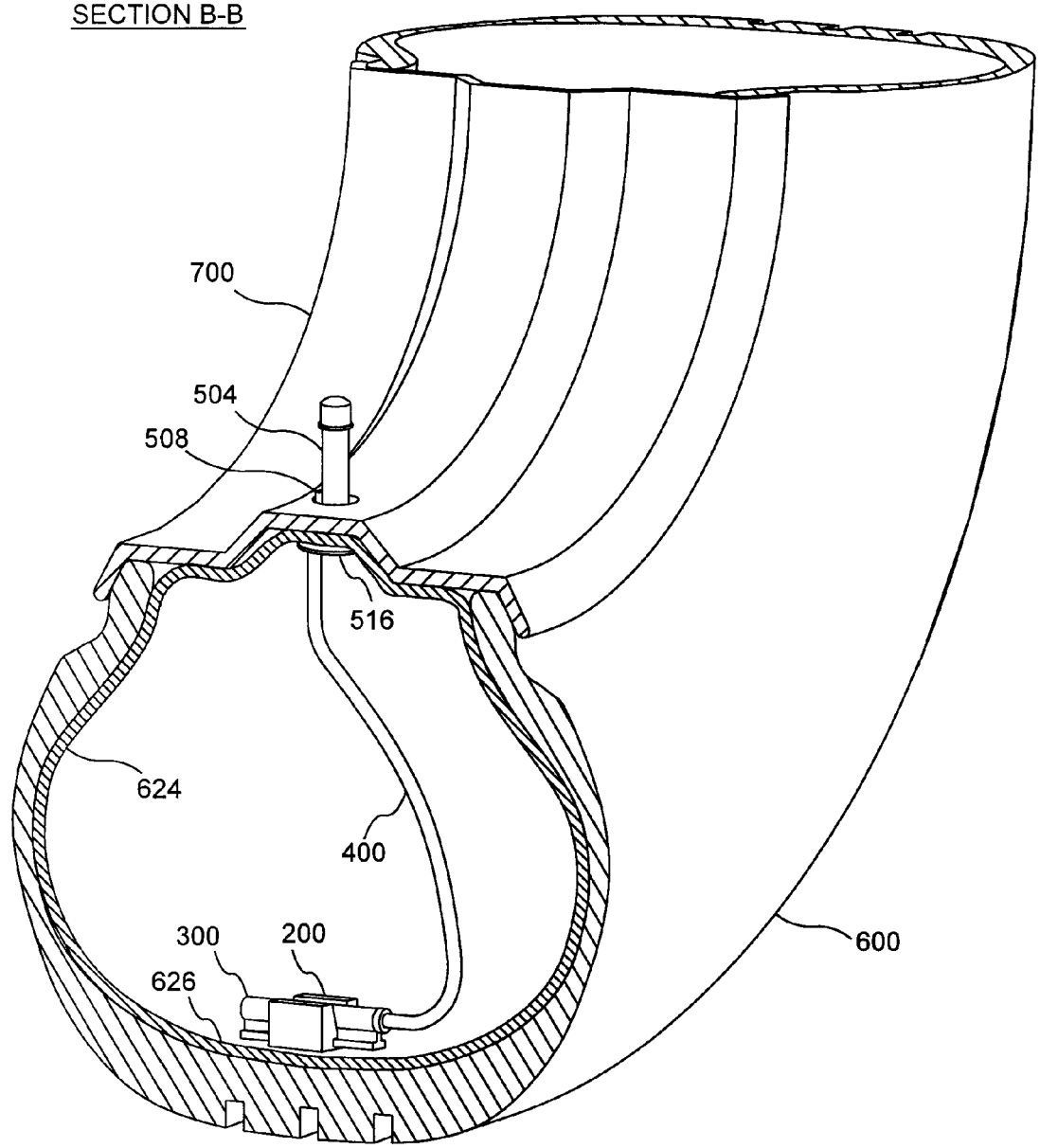
FIG. 15 is a pictorial view of an example of an embodiment of the invention adapted for installation in an inner tube. A location and viewing direction for FIG. 15 is shown by the line marked B-B in FIG. 12.

FIGS. 12-15 illustrate examples of embodiments installed in pneumatic tires. FIG. 12 shows a side view of a tire and a portion of a wheel resting on a hard surface, for example a road surface. FIG. 13 shows a view of the tread surface of the tire of FIG. 12. FIGS. 12-13 are representative of a tire supporting weight, for example the weight of a vehicle, as indicated in FIG. 12 by a flat sector of the tire in an area where the outer peripheral surface of the tire 600 contacts the road surface 616. FIG. 12 also shows a peripheral portion of a wheel 700, a tire valve 500 protruding from the wheel 700, and further illustrates the location and viewing direction for a sectional view B-B. In FIG. 13, weight on the tire is represented by a smaller radius of curvature on the lower sides of the tire 600 tangent to the road surface 616 than on the upper sides. FIG. 13 further shows the outer peripheral surface 602 of the tire, that is, the tread surface. Tread patterns in FIGS. 13-15 are simplified representations of many different tread patterns that may be found on tires. The location and viewing direction for a sectional view C-C is marked in FIG. 13.

An example of an embodiment of a pressure maintenance device installed in a tire with a wheel is shown in FIG. 14. FIG. 14 is a partial sectional view of the tire 600 as marked by line B-B in FIG. 12, representing a quarter of the complete circumference of the tire. The tire 600 is seated against a wheel 700. Central portions of the wheel have been omitted to simplify the figures. An example of a tire valve 500 is removably attached to the wheel 700. The bypass hole 508 in the body of the valve 500, through which air passes from outside the tire to parts of the pressure maintenance device within the tire, is visible on the side of the tire valve 500. An optional tubing connector 402 is inserted into the bypass hole 508 on the valve body 506 inside the tire 600. Flexible tubing 400 attached to the tubing connector 402 on the valve body 506 and to another tubing connector 402 on the compression tube 300 provides a pathway for outside air to enter an air reservoir within the device. Alternatively, the flexible tubing 400 and a tubing connector 402 may be attached to a part of the wheel 700 having a through-hole for admitting air from outside the tire, instead of being connected to a tire valve as in FIG. 14.

The compression tube 300, which is representative of a component having an air reservoir, is attached to a compression strip 200 as shown in FIG. 14 and as previously described. The compression strip 200 is strongly attached, for example by a strong adhesive, to an inner peripheral surface 604 of the tire 600. In embodiments having separate compression blocks, the individual compression blocks are attached to the inner peripheral surface of a tire. The inner peripheral surface 604 and the outer peripheral surface 602 are both indicated in FIG. 14. FIG. 14 further illustrates a preferred orientation of the compression strip 200 and the compression tube 300 relative to the tire 600. In FIG. 14, a longest axis 320 of the compression tube 300, corresponding to a longest axis of the through-hole 302 in FIG. 2 and further corresponding to a long axis of an air reservoir, is approximately parallel to an edge of a transverse section of the tire. A preferred orientation of the compression tube 300 is therefore an orientation with the longest axis of the air reservoir approximately parallel to the axis of rotation 704 of the wheel and tire. However, embodiments of the invention continue their function, although at reduced efficiency, even if the compression tube is misaligned from the preferred orientation.

FIG. 15 illustrates an alternative embodiment of a device for automatically maintaining tire pressure. The pressure maintenance device of FIG. 15 includes an inner tube 624 with a valve stem 504 attached to the inner tube 624 on a flange 516. A bypass hole 508 in the valve body, or optionally a bypass hole formed in the flange 516, allows outside air to bypass the valve mechanism in the valve stem 504 and enter the flexible tubing 400 attached to the flange. The compression strip 200 is strongly attached to an inner peripheral surface 626 of the inner tube 624 so that, when the inner tube 624 is installed in a tire 600, the long axis of the compression tube 300 is parallel to the axis of rotation of the tire 700 and wheel 600. The compression strip 200, compression tube 300, and other parts of the pressure maintenance device are installed inside the inner tube 624 at the time the inner tube is manufactured.

Figure 16:
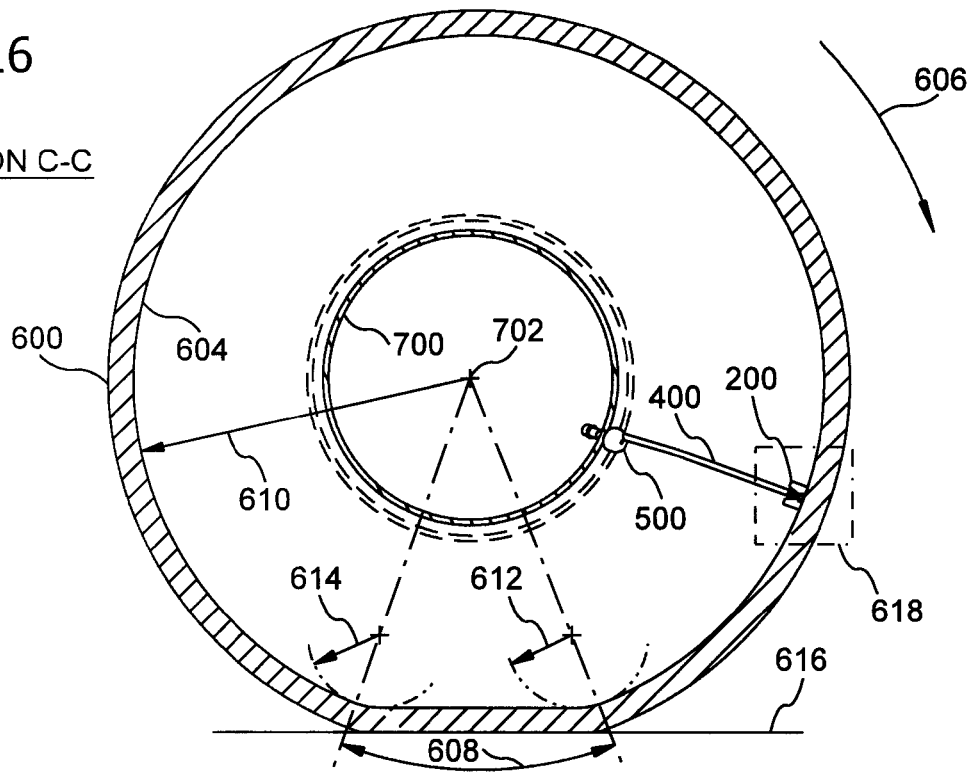
FIG. 16 is a sectional view of the embodiment of FIG. 1 installed in the tire of FIG. 12 and FIG. 13. A location and viewing direction for FIG. 16 is shown by a line marked C-C in FIG. 13.
Figure 17:
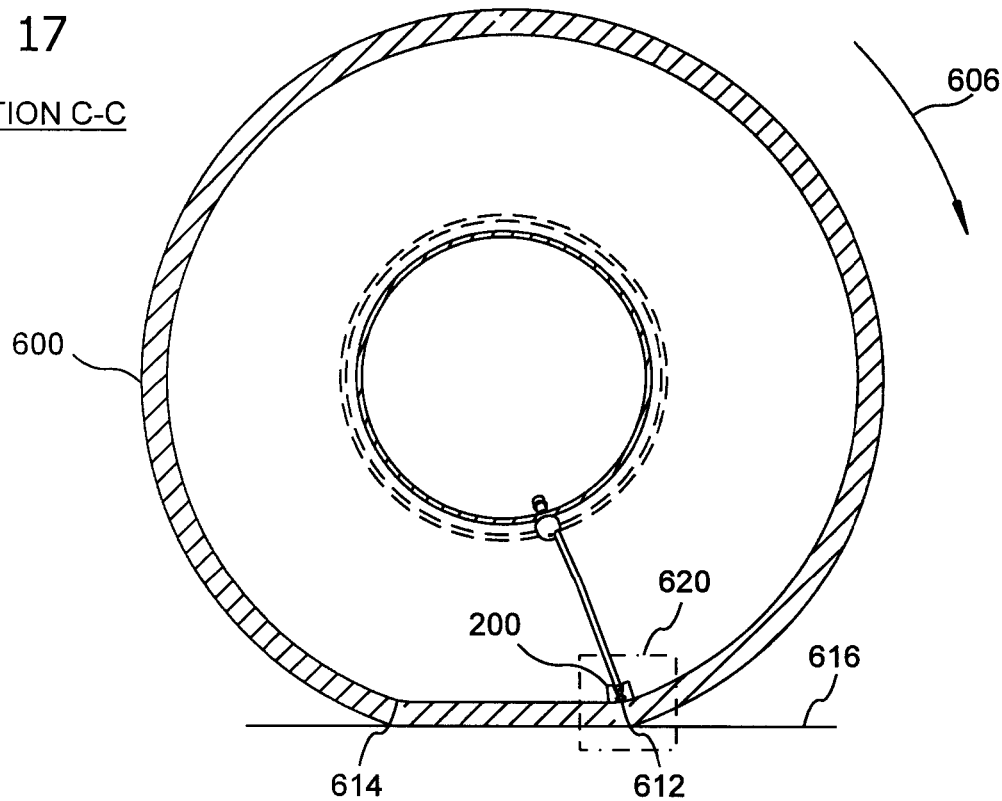
FIG. 17 is a sectional view in which the wheel, tire, and pressure maintenance device of FIG. 16 have been rotated about the axis of rotation of the tire and wheel until the compression strip is entering a radiused corner above the leading edge of the compressed sector of the tire. A location and viewing direction for the sectional view of FIG. 17 is shown by the line marked C-C in FIG. 13.
Figure 18:
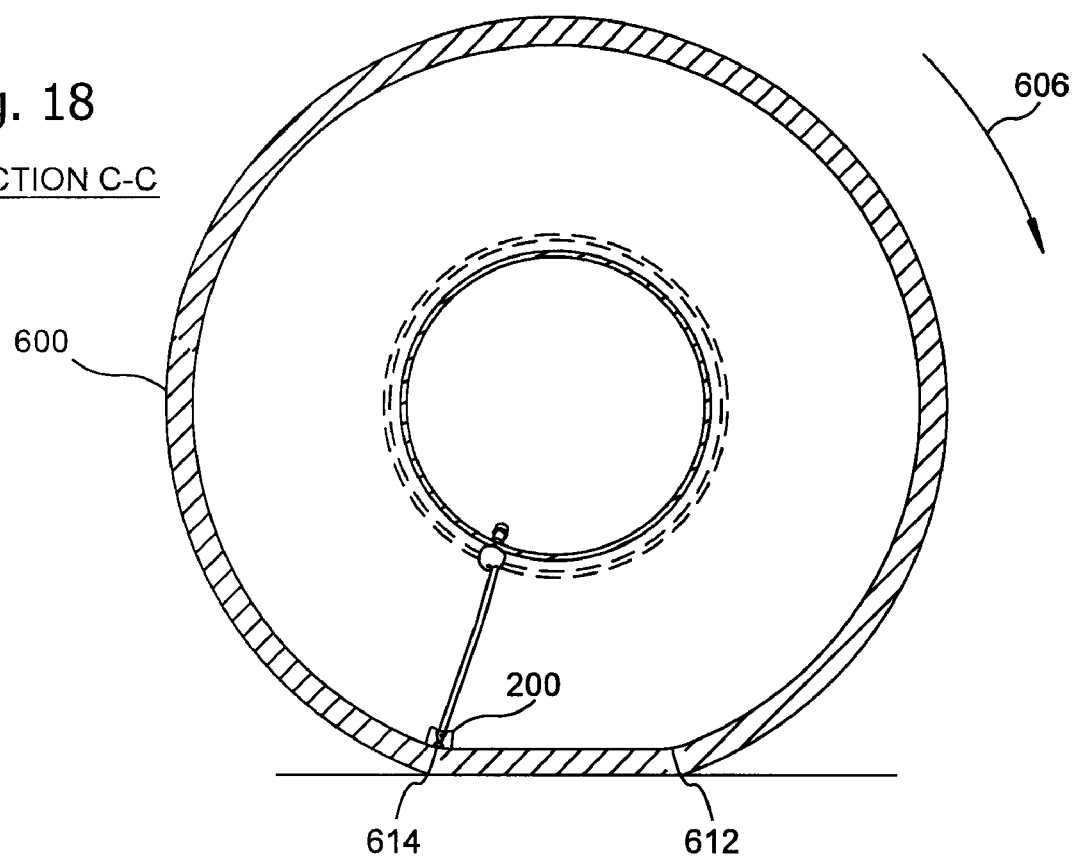
FIG. 18 is a section view in which the wheel, tire, and embodiment of FIG. 16 and FIG. 17 have been rotated until the compression strip is exiting the compressed sector of the tire. A location and viewing direction for the sectional view of FIG. 18 is shown by the line marked C-C in FIG. 13.

A sequence of motions related to maintenance of tire inflation pressure by an embodiment of the invention will be described with reference to FIGS. 16-20. FIGS. 16-18 are simplified cross-sectional views of an example of a tire, representing three views of a tire 600 under load at three different rotation angles while rolling along a road surface 616. The location and viewing direction for the cross-sectional views in FIGS. 16-18 is shown by a line marked C-C in FIG. 13. A center point 702 in FIG. 16 marks the axis of rotation of the tire 600 and wheel 700. An example of a direction of rotation 606 about the axis of rotation is further indicated with an arrow pointing in a clockwise direction of rotation. In the flat sector of the tire 608, the outer peripheral surface of the tire 600 is seen to be pressed inward toward the axis of rotation at the center point 702 relative to the internal radius 610 of an uncompressed part of the tire. On the inner peripheral surface of the tire 604, a bend radius 612 is shown above the leading edge of the flat sector 608. Another bend radius 614 is shown above the trailing edge of the flat sector 608. The approximate boundaries of the flat sector 608 are marked by centerlines passing from the axis of rotation of the tire through the center point 702 and through the centers of the two bend radii (612, 614) above the leading and trailing edges of the contact patch.

"Leading" and "trailing" are used with respect to the tire's direction of rotation 606. The bend radii at the leading and trailing edges of the flat sector 608 are relatively small compared to the internal radius 610 of an uncompressed section of the tire. FIG. 16 further illustrates an example of a pressure maintenance device in a rotational position ahead of the flat sector of the tire 608, that is, before the compression strip enters a region above the tire's contact patch. The location of an enlarged view of a compression strip and air reservoir, to be discussed with reference to FIG. 19, is indicated by a border line 618 in FIG. 16.

FIG. 17 continues with the example of FIG. 16, with the tire rotated further in a clockwise direction until the compression strip 200 is above the bend radius 612 at the leading edge of the flat sector 608. The location of an enlarged view of parts of the pressure maintenance device in this rotational position is indicated by a border line 620 and is shown in more detail in FIG. 20. FIG. 18 shows the tire 600 rotated yet again until the compression strip 200 is above the bend radius 614 at the trailing edge of the flat sector of the tire.

Figure 19:
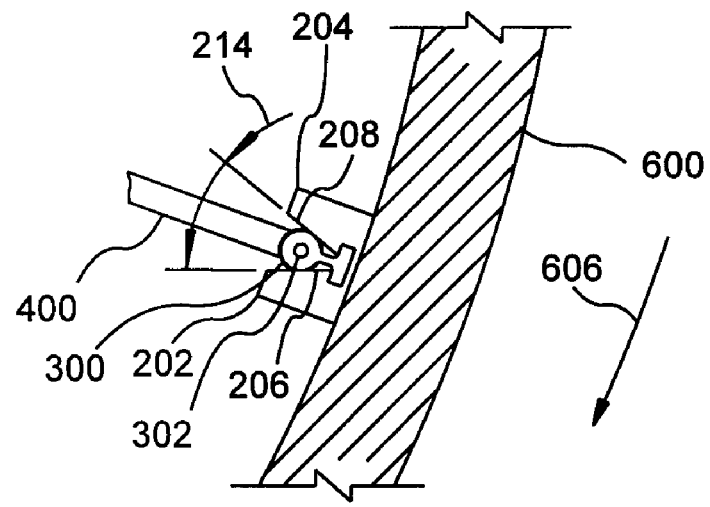
FIG. 19 is an enlarged sectional view of an area marked with boundary lines 618 in FIG. 16. In the example of FIG. 19, the air reservoir is in an uncompressed state.

A compression strip and compression tube, both in a relaxed or uncompressed state, are shown in the enlarged partial section view of FIG. 19. The compression strip and air reservoir, the air reservoir represented in FIG. 19 by the compression tube, are in a relaxed state whenever the pressure maintenance device is not pumping air into the tire, that is, whenever the compression strip is not close to either the leading edge or the trailing edge of the flat sector of the tire. In particular, the compression strip and air compression tube are in a relaxed state when the compression strip is above the contact patch but between the bend radius at the leading edge of the flat sector and the bend radius at the trailing edge. Each time the compression strip passes through one of the two bend radii at either edge of the flat sector on the inner peripheral surface of the tire above the contact patch, the compression strip and compression tube are subjected to a compression cycle. A pressure maintenance device in accord with an embodiment of the invention therefore performs two compression cycles per wheel revolution.

A first compression cycle begins with the compression strip and compression tube in a relaxed state, as shown in FIG. 19. FIG. 19 presents an end view of the outlet end of the through-hole 302 in the compression tube 300. The compression tube 300 is contacted on the side of the leading compression block 202 by a first compression face 206 and on the side of the trailing compression block 204 by a second compression face 208. A portion of the flexible tube 400 attached to the inlet end of the compression tube 300 is visible in FIG. 19, as is a partial sectional view of the tire 600 and a direction of rotation 606. The through-hole 302 and the collapsible segment of the air reservoir are shown in FIG. 19 with their uncompressed dimensions. A first angle 214 between the first and second compression faces corresponds to the relaxed position of the leading and trailing compression blocks.

Figure 20:
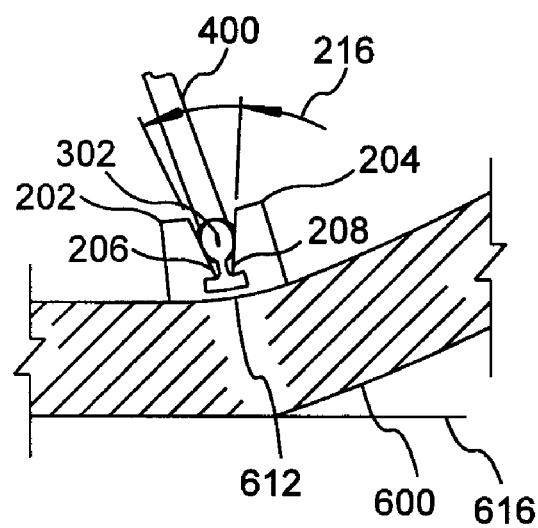
FIG. 20 is an enlarged sectional view an area marked with boundary lines 620 in FIG. 17. In the example of FIG. 20, the collapsible segment of the air reservoir is in a fully compressed state.
Figure 20:
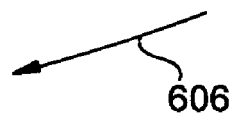

As the wheel rotates from the position shown in FIG. 16 to the position shown in FIG. 17, the compression strip 200 enters the bend radius 612 at the leading edge of the flat sector, and the compression stage of a compression cycle begins. As the compression strip passes through the bend radius 612, the leading compression block 202 and the trailing compression block 204 on the compression strip, which is firmly attached to the inner peripheral surface of the tire, are deflected toward each other and the collapsible segment of the air reservoir enters a compressed state. FIG. 20 illustrates a second angle 216 between the first compression face 206 on the leading compression block 202 and the second compression face 208 on the trailing compression block 204 in which the collapsible segment of the air reservoir is fully compressed, that is, the volume of the collapsible segment of the air reservoir has been reduced to a minimum value.

The first compression cycle is completed when the compression strip is rotated away from the bend radius 612 at the leading edge of the flat sector of the tire and the compression strip and compression tube return to the relaxed state shown in FIG. 19. A second compression cycle begins when the compression strip 200 is rotated to the bend radius 614 at the trailing edge of the flat sector, as shown in FIG. 18. The sequence of motions of the collapsible segment is the same in the second compression cycle as in the first compression cycle.

A compression cycle compresses air inside the air reservoir to a selected value of set point pressure. Air is expelled from the air reservoir into the tire through the outlet valve when the air pressure inside the air reservoir is greater than the air pressure in the tire. When the air pressure in the tire is greater than the air pressure in the air reservoir, air is not expelled into the tire. A compression cycle therefore does not always result in air being expelled into the tire. Furthermore, operation of an embodiment of the invention will not cause a tire to over-pressurize.

Figure 21:
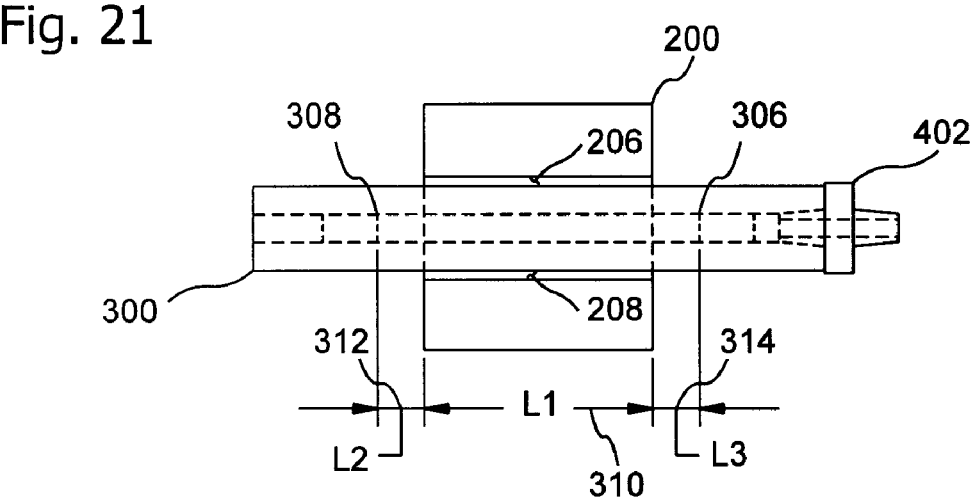
FIG. 21 is a top view of an example of a compression strip and a compression tube, illustrating examples of positions for the inlet valve and the outlet valve and further illustrating lengths for determining a pressure set point value. In the example of FIG. 21, the collapsible segment of the air reservoir, marked by length L1, is in an uncompressed state.

A value of set point pressure for an embodiment is selected by choosing the relative volumes of the accumulator segments and collapsible segment of the air reservoir. FIGS. 21-25 illustrate relative dimensions associated with selection of a set point pressure for different embodiments of the invention. FIG. 21 is a simplified top view of a compression tube 300 mounted between a first compression face 206 and a second compression face 208 of a compression strip 200. An optional tubing connector 402 is inserted into the inlet end of the compression tube 300. The compression strip 200 may optionally be either of the types shown in FIG. 4 or FIG. 5. A length dimension L1 310 of the first and second compression faces corresponds to a length over which the compression tube 300 is compressed during a compression cycle, that is, L1 is representative of the length of the collapsible segment of an air reservoir. The air reservoir extends from the inlet valve 306 to the outlet valve 308 inside the compression tube 300. A length dimension L2 312 between a face of the outlet valve 308 and an edge of a compression face of a compression block represents a length of an accumulator segment of the air reservoir. Another length dimension L3 314 between a face of the inlet valve 306 and another edge of a compression face represents a length of another accumulator segment of the air reservoir.

Figure 22:
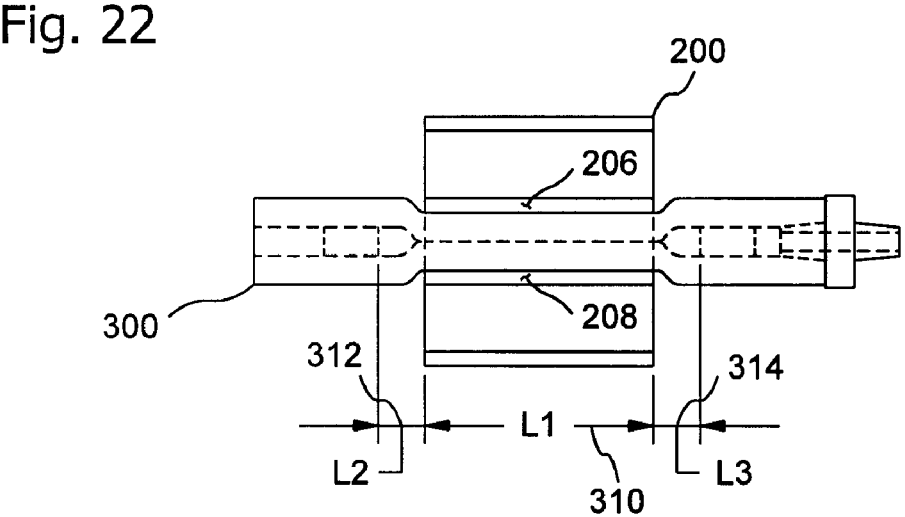
FIG. 22 is a top view of the example of FIG. 21, in which the compression faces of the compression strip have been displaced toward each other. The collapsible segment of the air reservoir is shown in a fully compressed state. The accumulator segments of the compression tube are visible in FIG. 22 as those parts of the compression tube between the inlet valve and the edges of the compression strip on one side of the collapsible segment and the outlet valve and the edges of the compression strip on the other side of the collapsible segment.

As a compression tube moves from a relaxed state to a compressed state during a compression cycle, air is displaced from the collapsible segment corresponding to the length L1 310 into the accumulator segments marked by L2 312 and L3 314. The pressure in the accumulator segments indicated by lengths L2 312 and L3 314 increases up to a maximum value when the collapsible segment of length L1 310 is fully compressed. Lengths L1, L2, and L3 are selected such that the pressure in the partially compressed segments is the selected set point value of pressure when the segment L1 is fully compressed. FIG. 22 shows the example of a compression tube from FIG. 21 with the collapsible segment in a fully compressed state in which the first compression face 206 and the second compression face 208 of the compression strip 200 are displaced toward one another by a maximum amount.

It is preferred that the inlet valve 306 and outlet valve 308 open with a very small pressure difference from the inlet side to the outlet side of each valve. The spring constants of components inside the valves will then have a negligible effect on the pressure of the air inside the air reservoir. The ability of an embodiment of the invention to maintain air pressure in a tire therefore does not significantly depend on the spring constants of components in the inlet and outlet valves. The lengths L1, L2, and L3, as well as the overall lengths of the compression tube and compression strip, are easily modified for alternative embodiments for different set point pressures and different sizes of tires.

The volumes, and for an air reservoir having a uniform internal diameter, the lengths of the accumulator and collapsible segments are related to a selected value of set point pressure, as mentioned above. The ratio of atmospheric pressure outside a tire to a selected value of set point pressure within the tire is inversely proportional to the ratio of the combined volumes of the accumulator segments and collapsible segment to the volume of the collapsible segment, and is approximately equal to the ratio of lengths (L1+L2+L3):L1 for a cylindrical air reservoir of constant diameter as in FIG. 2, FIG. 7, and FIG. 21. Once the desired set point pressure is known, length parameters may readily be assigned values that are convenient for manufacturing and installation into a particular size of tire.

Figure 23:
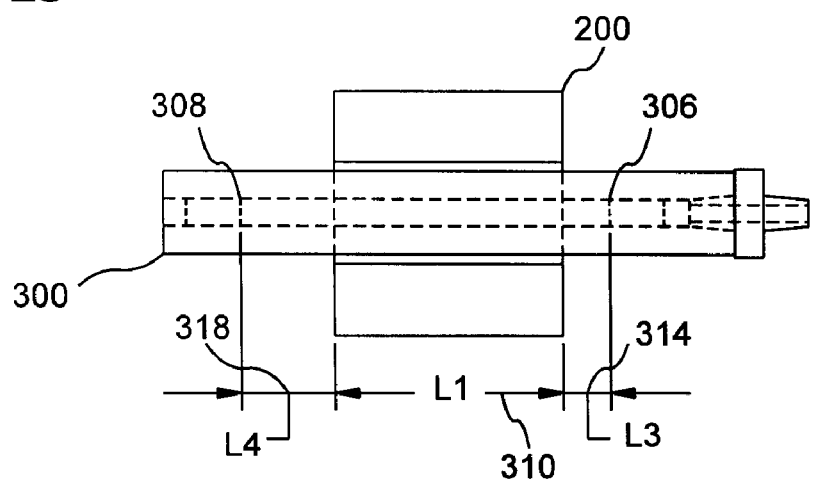
FIG. 23 is a top view of the examples of FIG. 21 and FIG. 22, in which a position of the outlet valve has been changed to select a new pressure set point value related to new relative volumes of the collapsible segment and accumulator segments of the air reservoir.

FIG. 23 shows an embodiment with a different value of set point pressure compared to the example of FIGS. 19 and 20. In FIG. 23, the outlet valve 308 has been repositioned to a new separation distance L4 318 from the edge of the compression faces. The separation distance L4 is greater than the separation distance L2 312 in FIGS. 19-20, so the ratio of L1/(L1+L4+L3) is less than the ratio of L1/(L1+L2+L3), and the embodiment of FIG. 23 has a lower set point pressure than the embodiment of FIGS. 19-20.

Figure 24:
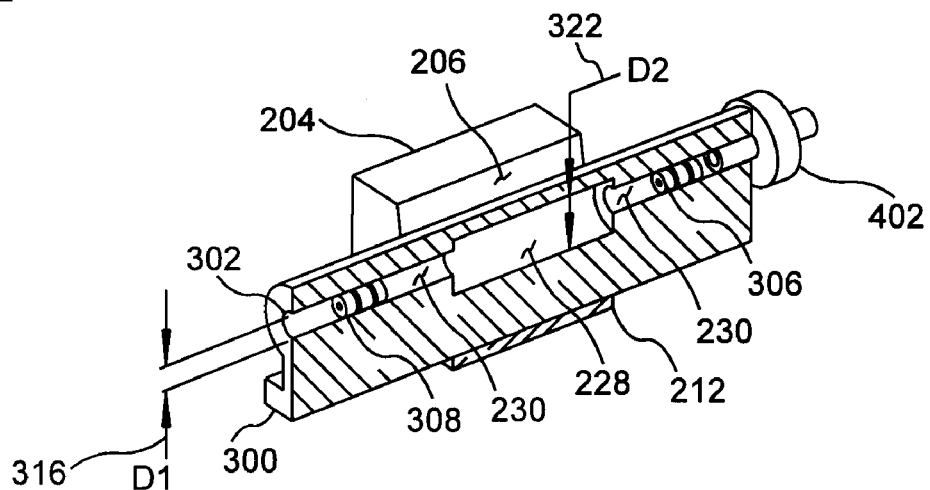
FIG. 24 is a sectional view showing an alternative for changing the relative volumes of the accumulator segments and collapsible segment of the air reservoir. In the embodiment of FIG. 24, the collapsible segment is formed with a different diameter than the accumulator segments. A location and viewing direction for the sectional view of FIG. 24 is shown by the line marked A-A in FIG. 6.

Other means of configuring a pressure set point by establishing a ratio of relative volumes of the accumulator and collapsible segments are used in alternative embodiments of the invention. In the embodiment shown in FIG. 24, a ratio of relative volumes of the accumulator and collapsible segments of an air reservoir is selected by selecting different diameters for the accumulator and collapsible segments of the air reservoir. FIG. 24 is an alternative sectional view A-A for an embodiment having an external appearance similar to that of FIG. 6. The location and viewing direction of section A-A in FIG. 24 is marked by the line A-A in FIG. 6. In FIG. 24, two accumulator segments 230 are each formed as part of a cylindrical through-hole 302 having a diameter D1 316. An end of each accumulator segment is defined by a valve (306, 308) as in other embodiments. An opposite end of each accumulator segment is the same as the corresponding end of the collapsible segment 228. A collapsible segment 228 having a length the same as the length of a compression face 206 of a compression block, which in the example of FIG. 24 is a trailing compression block 204, has a cylindrical void with a diameter D2 322. The embodiment of FIG. 24 may optionally be manufactured by forming the compression tube in two pieces shaped approximately like the sectional view in the figure, then joining the two pieces into a complete compression tube. Alternatively, the compression tube may be assembled from separate segments joined end-to-end, with the center collapsible segment having an air reservoir with a larger diameter than the accumulator segments at each end.

Figure 25:
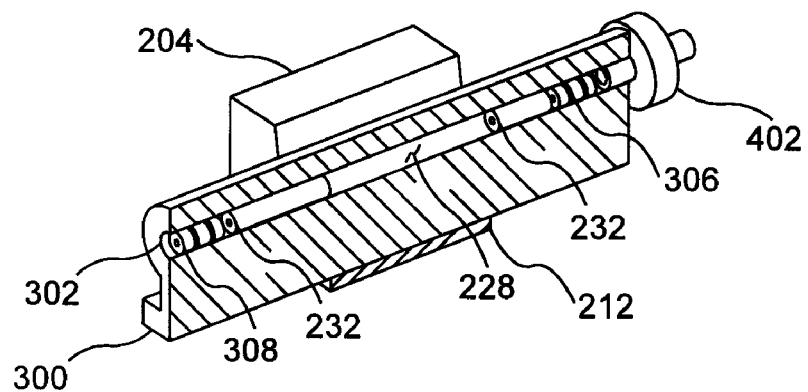
FIG. 25 is a sectional view showing yet another alternative for changing the relative volumes of the accumulator segments and collapsible segment of the air reservoir. In the example of FIG. 25, a hollow tube has been inserted into the accumulator segment of the air reservoir near the inlet end and another hollow tube has been inserted into the accumulator segment near the outlet end in order to selectively reduce the volume of the accumulator segments relative to the volume of the collapsible segment.

In the embodiment shown in FIG. 25, a selected ratio of relative volumes of the accumulator and collapsible segments of an air reservoir is established by inserting a hollow tube in each accumulator segment to reduce the volume of the accumulator segment relative to the volume of the collapsible segment. A first hollow tube 232 is shown in FIG. 25 close to the outlet valve 308 in the accumulator segment of the air reservoir. A second hollow tube 232 is shown in the second accumulator segment near the inlet valve 306 and tubing connector 402. The ends of the hollow tubes 232 do not extend into the collapsible segment 228 of the air reservoir. A ratio of relative volumes between the accumulator and collapsible segments, corresponding to a set point pressure, may optionally be selected by selecting a length dimension or an interior hole diameter dimension of the hollow tubes, or a combination of both dimensions.

A method for automatically maintaining air pressure in a tire with a device in accord with an embodiment of the invention begins with selecting a tire for the device to be installed in and a pressure set point value for air pressure in the tire. Then, lengths for the collapsible and accumulator segments are selected in a ratio approximately equal to a ratio between atmospheric pressure outside the tire to the pressure set point value.

Next, an air reservoir is attached to a compression strip. For example, an air reservoir as in FIG. 2 may optionally be attached with adhesive to a compression strip as in FIG. 4, or alternately a compression strip as in FIG. 5. Then, the compression strip is attached with adhesive to an inner peripheral surface of the tire as in FIG. 14, or alternately to an inner peripheral surface of an inner tube as in FIG. 15.

The method continues with attaching a first end of a flexible tube for receiving air from outside the tire to an inlet on the air reservoir, for example a tubing connector attached to an end of a compression tube as in FIG. 14. Next, a tire valve having a bypass hole is attached to the rim on which the tire is to be seated, as in FIG. 14, and a second end of the flexible tube is connected, for example by a tubing connector, to the bypass hole. Alternatively, the flexible tube is connected to a bypass hole formed in a part of the rim or a part of the tire.

After the component parts of the pressure maintenance device are installed in the tire and connected together, the tire is seated on the rim. Placing the tire and wheel on a vehicle, thereby loading the tire with weight and creating a flat sector in the peripheral surface of the tire where the tire contacts a road surface, and then rotating the tire by driving the vehicle, as in FIGS. 16-18, causes the pressure maintenance device to pump air from outside the tire into the tire whenever pressure inside the tire is less than the pressure set point value, as in FIGS. 19-22.

Unless expressly stated otherwise herein, ordinary terms have their corresponding ordinary meanings within the respective contexts of their presentations, and ordinary terms of art have their corresponding regular meanings.

What is claimed is:

1. A device for maintaining pressure in a tire, comprising:
    a first compression block having a first compression face;
    a second compression block having a second compression face;
    an air reservoir positioned between said first compression face and said second compression face and adapted to receive air from outside the tire;
    a pressure set point value for air pressure in the tire;
    a collapsible segment for compressing air received from outside the tire; and
    at least one accumulator segment for receiving air expelled from said collapsible segment,
    wherein rotation of the tire causes said first compression face and said second compression face to be displaced toward each other when said first and second compression blocks pass over an edge of a flattened sector of the tire, thereby compressing said air reservoir and pressurizing air inside said air reservoir to said pressure set point value, said first and second compression faces are adapted to apply pressure to said collapsible segment, air in said air reservoir is released into the tire up to twice per revolution of the tire when a relative motion between said first and second compression faces compresses said air reservoir and causes air pressure in said air reservoir to be greater than air pressure in the tire, a ratio of atmospheric pressure outside the tire to said pressure set point value is inversely proportional to the ratio of the sum of the volumes of said air reservoir in said accumulator and collapsible segments to the volume of said air reservoir in said collapsible segment, said air reservoir is formed with a void having a longest axis, said air reservoir having a longitudinal axis corresponding to said longest axis, and when installed in the tire, said longitudinal axis of said air reservoir is approximately parallel to an axis of rotation about which the tire may roll.

2. The device for maintaining pressure in a tire of claim 1, wherein said air reservoir is adapted to release air into the tire when air pressure in the tire is less than said pressure set point value.

3. The device for maintaining pressure in a tire of claim 1, wherein said first and second compression blocks are joined by a flexible web.

4. The device for maintaining pressure in a tire of claim 1, wherein said first and second compression blocks are adapted for attachment to an inner peripheral surface of an inner tube for a tire.

5. The device for maintaining pressure in a tire of claim 4, further comprising said inner tube for a tire.

6. The device for maintaining pressure in a tire of claim 1, wherein said first and second compression blocks are adapted for attachment to an inner peripheral surface of the tire without either of said first and second compression blocks in contact with a sidewall of the tire.

7. The device for maintaining pressure in a tire of claim 6, further comprising the tire.

8. The device for maintaining pressure in a tire of claim 1, further comprising:
    a first accumulator segment having a first accumulator segment length;
    a second accumulator segment having a second accumulator segment length; and
    a length of said collapsible segment,
    wherein a ratio of atmospheric pressure outside the tire to said pressure set point value is approximately equal to a ratio of a sum of said first accumulator segment length, said second accumulator segment length, and said length of said collapsible segment to said length of said collapsible segment.

9. The device for maintaining pressure in a tire of claim 1, further comprising:
    a first selected value of air reservoir diameter in said accumulator segment; and
    a second selected value of air reservoir diameter in said collapsible segment,
    wherein said first and second diameter values are unequal and are related to said pressure set point value.

10. The device for maintaining pressure in a tire of claim 1, further comprising a hollow insert for reducing the volume of air in said first accumulator segment.

11. The device for maintaining pressure in a tire of claim 1, wherein said air reservoir further comprises:
    a compression tube having a first end, and a second end, and a through-hole parallel to said longitudinal axis from said first end to said second end;
    an inlet valve installed in said through-hole in said compression tube, wherein said inlet valve prevents air from inside the air reservoir from flowing out of the tire; and an outlet valve installed in said through-hole in said compression tube, wherein said outlet valve prevents air inside the tire from flowing into said air reservoir.

12. The device for maintaining pressure in a tire of claim 11, further comprising:
    a flexible tube adapted to receive air from outside the tire; and
    a tubing connector for joining said flexible tube to said first end of said compression tube.

13. The device for maintaining pressure in a tire of claim 12, further comprising:
    a tire valve having a valve body with a bypass hole, wherein said flexible tube receives air from outside the tire through said bypass hole and said air reservoir receives air from outside the tire through said flexible tube; and
    a hydrophobic filter installed in said bypass hole.

14. A method for installing a pressure maintenance device in a tire, comprising:
    attaching a compression tube having an air reservoir to a compression strip;
    attaching the compression strip to an inner peripheral surface of the tire with a longitudinal axis for the compression tube approximately parallel to a rotational axis for the tire;
    attaching a first end of a flexible tube for receiving air from outside the tire to an inlet on the compression tube; and
    attaching a second end of the flexible tube to a bypass hole.

15. The method for automatically maintaining air pressure in a tire of claim 14, further comprising:
    forming the bypass hole in a tire valve for air from outside the tire to enter the flexible tube without passing through a valve mechanism in the tire valve;
    selecting a pressure set point value for air pressure in the tire; and
    selecting a length of a collapsible segment of the air reservoir and a length of an accumulator segment of the air reservoir, wherein a ratio of a sum of the length of the accumulator segment and the length of the collapsible segment to the length of the collapsible segment is approximately equal to a ratio between air pressure outside the tire to the pressure set point value.

16. A method for automatically maintaining air pressure in a tire having a pressure maintenance device, comprising:
    rotating the tire until the pressure maintenance device is above a leading edge of a contact patch between the tire and a road surface;
    deflecting a first compression block in the pressure maintenance device toward a second compression block in the pressure maintenance device, thereby increasing air pressure in the pressure maintenance device and starting a first compression cycle;
    after starting the first compression cycle, and if air pressure inside the pressure maintenance device is greater than air pressure inside the tire, expelling air from the pressure maintenance device into the tire;
    incrementally rotating the tire until the first and second compression blocks deflect away from each other, and if air pressure in the pressure maintenance device is less than air pressure outside the tire, drawing air from outside the tire into the pressure maintenance device, thereby completing the first compression cycle;
    after completing the first compression cycle, incrementally rotating the tire until the pressure maintenance device is above a trailing edge of the contact patch between the tire and the road surface;
    deflecting the first compression block in the pressure maintenance device toward the second compression block in the pressure maintenance device, thereby increasing air pressure in the pressure maintenance device and starting a second compression cycle;
    after starting the second compression cycle, and if air pressure inside the pressure maintenance device is greater than air pressure inside the tire, expelling air from the pressure maintenance device into the tire; and
    incrementally rotating the tire until the first and second compression blocks deflect away from each other, and if air pressure in the pressure maintenance device is less than air pressure outside the tire, drawing air from outside the tire into the pressure maintenance device, thereby completing the second compression cycle within the same revolution of the tire as the first compression cycle.

* * * * *